United States Patent
Recriwal et al.

(10) Patent No.: US 10,475,009 B2
(45) Date of Patent: Nov. 12, 2019

(54) METHOD AND SYSTEM FOR CARDLESS USE OF AN AUTOMATED TELLER MACHINE (ATM)

(71) Applicant: MasterCard International Incorporated, Purchase, NY (US)

(72) Inventors: Adarsh Recriwal, Delhi (IN); Amit Gupta, New Delhi (IN); Dhruv Akhauri, Gurgaon (IN)

(73) Assignee: Mastercard International Incorporated, Purchase, NY (US)

( * ) Notice: Subject to any disclaimer, the term of this patent is extended or adjusted under 35 U.S.C. 154(b) by 272 days.

(21) Appl. No.: 15/333,960

(22) Filed: Oct. 25, 2016

(65) Prior Publication Data

US 2017/0124544 A1    May 4, 2017

(30) Foreign Application Priority Data

Oct. 29, 2015  (SG) ............................ 10201508945Y

(51) Int. Cl.

| | |
|---|---|
| *G06Q 20/10* | (2012.01) |
| *G06Q 20/40* | (2012.01) |
| *G07F 19/00* | (2006.01) |
| *G06Q 20/32* | (2012.01) |
| *G06Q 20/38* | (2012.01) |

(52) U.S. Cl.
CPC ......... *G06Q 20/1085* (2013.01); *G06Q 20/32* (2013.01); *G06Q 20/385* (2013.01); *G06Q 20/4012* (2013.01); *G06Q 20/40145* (2013.01); *G07F 19/20* (2013.01)

(58) Field of Classification Search
CPC .............. G06Q 20/1085; G06Q 20/32; G06Q 20/40145; G06Q 20/4012; G06Q 20/385; G07F 19/20
See application file for complete search history.

(56) References Cited

U.S. PATENT DOCUMENTS

| | | | |
|---|---|---|---|
| 5,650,604 A | 7/1997 | Marcous et al. | |
| 6,045,039 A * | 4/2000 | Stinson | G06Q 20/18 235/379 |

(Continued)

FOREIGN PATENT DOCUMENTS

| | | | | |
|---|---|---|---|---|
| CN | 101882343 A | 11/2010 | | |
| IN | 3468/DEL/2014 | * | 2/2015 | ............. G06Q 40/00 |

(Continued)

OTHER PUBLICATIONS ip.com: System and method for cardless transaction at atm (English), Publication No. IN 3468/DEL/2014 A, Feb. 20, 2015 (Published), pp. 1-15. (Year: 2015).*

(Continued)

*Primary Examiner* — Bijendra K Shrestha
(74) *Attorney, Agent, or Firm* — Armstrong Teasdale LLP

(57) ABSTRACT

A computer-implemented method for cardless use of an automated teller machine (ATM) is provided. The method includes receiving as an input, a user-identified ATM that the user wishes to use. The method also includes generating and transmitting a one-time password (OTP) for the user to enter at the identified ATM. The method further includes receiving and verifying the OTP entered into the ATM, and on successful verification, authorizing access to services available through the ATM, without use of a card.

17 Claims, 5 Drawing Sheets

(56) References Cited

U.S. PATENT DOCUMENTS

| | | |
|---|---|---|
| 6,286,756 B1 | 9/2001 | Stinson et al. |
| 6,636,833 B1 | 10/2003 | Flitcroft |
| 7,076,458 B2 | 7/2006 | Lawlor et al. |
| 7,136,835 B1 | 11/2006 | Flitcroft |
| 7,567,934 B2 | 7/2009 | Flitcroft |
| 7,568,615 B2 | 8/2009 | Corona et al. |
| 7,571,142 B1 | 8/2009 | Flitcroft |
| 7,593,896 B1 | 9/2009 | Flitcroft |
| 7,686,213 B1* | 3/2010 | Ramachandran .... G06Q 20/042 235/379 |
| 8,676,707 B2 | 3/2014 | Flitcroft |
| 8,725,640 B2 | 5/2014 | Mateo Delgado et al. |
| 8,756,150 B2 | 6/2014 | Flitcroft |
| 8,924,712 B2* | 12/2014 | Varadarajan ....... G06Q 20/3276 713/155 |
| 2006/0206709 A1 | 9/2006 | Labrou |
| 2009/0070260 A1 | 3/2009 | Flitcroft |
| 2009/0078758 A1* | 3/2009 | Crowell ................ G06Q 20/40 235/380 |
| 2010/0063905 A1 | 3/2010 | De Tena Sainz |
| 2011/0016047 A1* | 1/2011 | Wu ................... G06Q 20/1085 705/43 |
| 2011/0238573 A1* | 9/2011 | Varadarajan ....... G06Q 20/1085 705/43 |
| 2012/0226610 A1 | 9/2012 | Gill et al. |
| 2013/0262303 A1* | 10/2013 | Metral ................. G07F 19/20 705/43 |
| 2013/0339235 A1 | 12/2013 | Tulluri et al. |
| 2015/0199671 A1 | 7/2015 | Bajaj et al. |
| 2016/0078430 A1 | 3/2016 | Douglas et al. |
| 2016/0104146 A1 | 4/2016 | Peyton |
| 2016/0180322 A1* | 6/2016 | Song ..................... H04W 12/06 705/44 |

FOREIGN PATENT DOCUMENTS

| | | | |
|---|---|---|---|
| WO | 2012177988 A1 | 12/2012 | |
| WO | 2015029064 A2 | 3/2015 | |
| WO | 2015054697 A1 | 4/2015 | |
| WO | WO-2015053470 A1 * | 4/2015 | ............ H04W 12/06 |
| WO | 2015084755 A1 | 6/2015 | |
| WO | 2015172150 A1 | 11/2015 | |
| WO | 2016089629 A1 | 6/2016 | |

OTHER PUBLICATIONS

Betab et al.: Fingerprints in Automated Teller Machine—A Survey, Apr. 2014, International Journal of Engineering and Advanced Technology (IJEAT), ISSN:2249-8958, vol. 3, Issue 4, pp. 183-186. (Year: 2014).*

Pearson Education, Inc.,: ATM Case Study, Part I: Object-Oriented Design with the UML, 2012, pp. 1-42. (Year: 2012).*

International Search Report, Application No. PCT/US2016/055457, dated Jan. 5, 2017, 10pps.

* cited by examiner

METHOD AND SYSTEM FOR CARDLESS USE OF AN AUTOMATED TELLER MACHINE (ATM)

CROSS REFERENCE TO RELATED APPLICATIONS

This application claims the benefit of Singapore Patent Application No. 10201508945Y filed Oct. 29, 2015, which is hereby incorporated by reference in its entirety.

BACKGROUND

The present disclosure relates to a method and system for cardless use of an automated teller machine (ATM).

A variety of banking services are available 24 hours a day through existing ATM networks. As such, a user can withdraw funds and/or access other services such as the checking of a balance and the depositing of funds in a plurality of locations at any time of day. However, access to banking services through ATMs is exclusively card-dependent. In other words, without a suitable card and personal identification number (PIN) none of the services provided by ATMs can be accessed by a user.

U.S. Pat. No. 5,650,604 describes a system for transferring funds from a sender to a receiver using an ATM. Although the receiver is not required to use a card, the sender must use a card to initiate the fund transfer. The receiver is then required to enter both the payment amount and a unique security code to access the funds from any ATM.

US2013/0339235 discloses a system for transferring funds from a sender to a receiver over the internet and for the receiver to collect the funds from an ATM using a card. Although the system may identify an ATM near a pick-up location, there is no contemplation of a system for cardless use of ATMs.

There is, therefore, a need to provide an improved method and system for cardless use of an automated teller machine (ATM).

BRIEF DESCRIPTION

In accordance with a first aspect of the disclosure, a computer-implemented method for cardless use of an automated teller machine (ATM) is provided. The method including receiving as an input a user-identified ATM that the user wishes to use, generating and transmitting a one-time password (OTP) for the user to enter at the identified ATM, receiving and verifying the OTP entered into the ATM, and on successful verification, authorizing access to services available through the ATM, without use of a card.

Embodiments of the disclosure, therefore, provide cardless user access to a variety of ATM services 24 hours a day, anywhere in the world. Notably, a user can withdraw his/her own money from the ATM without use of a card. For security reasons, the OTP will only be accepted at the particular ATM identified for use. This reduces the risk of fraudulent access by a third party who may guess or otherwise obtain the OTP but not know the location of the selected ATM.

Notably, U.S. Pat. No. 5,650,604 does not contemplate the case where the sender and receiver is the same person. In other words, U.S. Pat. No. 5,650,604 does not address the problem of a user wishing to access his/her own funds (or other services) through an ATM, without use of a card. Furthermore, U.S. Pat. No. 5,650,604 does not disclose the identification of any particular ATMs from which the cash (or other services) will be dispensed.

The services available through the ATM may include any services currently provided by ATMs or any services that may be added to ATMs in the future. For example, the services may include one or more of the following non-limiting examples: deposits, withdrawals, transfers, balance/overdraft information, pin services, account services, card-blocking, topping-up of pre-paid cards, and obtaining statements of accounts.

The user may identify the ATM he/she wishes to use through use of a website or mobile application "APP". Advantageously, embodiments of the disclosure can be implemented through a mobile device (i.e. smartphone or tablet computer) without requiring the use of a card and it is envisaged that mobile transactions will eventually completely replace card transactions using embodiments of the present disclosure.

The application may include one or more security features to prevent unauthorized use. The security features may include a password, PIN code, or biometrics (e.g. voice/retina/fingerprint recognition).

The method may further include a registration procedure in which a user is required to register his/her bank account or payment card with the application. The registration procedure may include the user answering one or more security questions in relation to himself/herself and/or his/her bank account. One or more of the answers may require verification by the user's bank account or payment card issuer. The registration procedure may include storing in a database contact details for the user (e.g. a mobile telephone number or email address) such that contact details can be used to deliver the OTP to the user.

Several options are possible for delivery of the OTP to the user. For example, once the user has installed the application on his/her mobile device and authenticated use of the application (e.g. via a PIN, password or biometrics), the application may establish a secure channel (VPN) to the server, and the OTP may be transmitted through this secure channel and displayed on the screen of the user's mobile device. In other embodiments, the user may include his/her mobile phone number in a user profile as part of the registration procedure and the server may send the OTP by means of a text message to the mobile phone. In another embodiment, the user may include his/her e-mail address in the profile and the server may send the OTP by means of an e-mail which can be accessed via the user's mobile device. Other means of delivering the OTP to the user may also be utilised (e.g. by voice telephone or through a link to a personalized webpage etc.).

As used in this document, the term "payment card" refers to any suitable cashless payment device, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, transponder devices, NFC-enabled devices, tablets, and/or computers.

The registration process may further include storing details for one or more user-identified ATM's that the user wishes to be able to use without their card. The ATMs may be identified from a map, list, search option, geo-location device, manual input, electronic input (e.g. QR code or barcode), or otherwise. An ATM may be pre-registered for use (i.e. by user pre-selection and subsequent storing in a database) and/or an ATM may be selected at a time of need.

For example, a user may choose to pre-register an ATM conveniently located near his/her home or workplace. In addition, when the user is in another location the user may use a geo-location function on their mobile device to identify an ATM near him/her and register that ATM for immediate use. In a further embodiment, a user may visit an ATM and, if he/she does not have a suitable debit or credit card with him/her, he/she may identify the ATM from its physical environment or signage (e.g. by entering an ATM ID code, building name, street name, post code or area into the application, or by scanning a barcode or QR code with the user's mobile device). The system will then retrieve details of the ATM from a suitable database and will identify it accordingly.

In use, the user may logon to the application by satisfying the security features provided (i.e. by entering his/her password). The user may then be presented with one or more control elements which can be interacted with by the user (e.g. by clicking, tapping, or pressing via a user interface) in order for the user to select the ATM he/she wishes to use. As explained above, this may or may not be an ATM already stored in the database associated with the user's account.

Optionally, the user may also select the type of service he/she requires from the selected ATM and possibly also further details, for example, that he/she wishes to make a withdrawal of $100.

The user may confirm the service required through use of a further control element. This may cause a communication module to transmit details of the requested service (e.g. identified ATM, service required, payment amount) to a server. The server may then check that the user is authorized to use such a service (e.g. by requesting approval of the withdrawal from the user's bank account over a payment network). If the requested service is authorized, the server may generate a one-time password (OTP) and transmit it to the user. The user may receive the OTP through a mobile device, for example, through the application (e.g. in response to a browser refresh of a web page) or as an SMS.

ATM's may need to be modified to offer the user an option of cardless withdrawal.

When the user enters the OTP at the selected ATM, the ATM will communicate with the server to verify the OTP and, if successfully verified, the server will instruct the ATM to provide the user with the requested service, without use of his/her card. Of course, if the OTP cannot be verified as correct (either because the password is wrong or the ATM used is not the one that was identified), access to the ATM's services will be refused.

Notably, embodiments of the present disclosure can be considered to have two levels of authorization—one of which requires the correct ATM to be used and the other of which requires the correct OTP to be entered. It is believed that this system mirrors the level of authorization currently associated with card transactions, wherein both a card and a password are required. In some embodiments, a further level of security is operable in the form of a security feature for accessing/enabling the application.

Additional security features may also be employed. For example, a limit may be placed on the amount of cash that can be withdrawn using the cardless method described. Furthermore, the OTP may be configured to expire after a pre-determined time period. An appropriate time period may be 15 to 30 minutes to allow time for a user to arrive at the selected ATM and/or for the user to reach the front of a queue at an ATM.

In accordance with a second aspect of the disclosure a computer system for cardless use of an automated teller machine (ATM) is provided. The computer system including a server configured to receive as an input a user-identified ATM that the user wishes to use, generate and transmit a one-time password (OTP) for the user to enter at the identified ATM, receive and verify the OTP entered into the ATM, and on successful verification, authorize access to services available through the ATM, without use of a card.

The optional method features described above may be implemented using the computer system according to the second aspect of the disclosure.

In accordance with a third aspect of the disclosure, a non-transitory computer-readable medium having stored thereon program instructions is provided. The program instructions causing at least one processor to receive as an input a user-identified ATM that the user wishes to use, generate and transmit a one-time password (OTP) for the user to enter at the identified ATM, receive and verify the OTP entered into the ATM, and on successful verification, authorize access to services available through the ATM, without use of a card.

In accordance with a fourth aspect of the disclosure, a mobile user device configured for a user to gain cardless access to an ATM is provided. The mobile user device configured to receive as an input a user-identified ATM that the user wishes to use, generate and transmit a one-time password (OTP) for the user to enter at the identified ATM, receive and verify the OTP entered into the ATM, and on successful verification, authorize access to services available through the ATM, without use of a card.

In accordance with a fifth aspect of the disclosure, an ATM adapted to allow cardless access to services is provided. The ATM configured to receive as an input a user-identified ATM that the user wishes to use, generate and transmit a one-time password (OTP) for the user to enter at the identified ATM, receive and verify the OTP entered into the ATM, and on successful verification, authorize access to services available through the ATM, without use of a card.

BRIEF DESCRIPTION OF THE DRAWINGS

Embodiments of the disclosure will now be described, by way of example only, with reference to the following drawings, in which.

DETAILED DESCRIPTION

Figure 1:
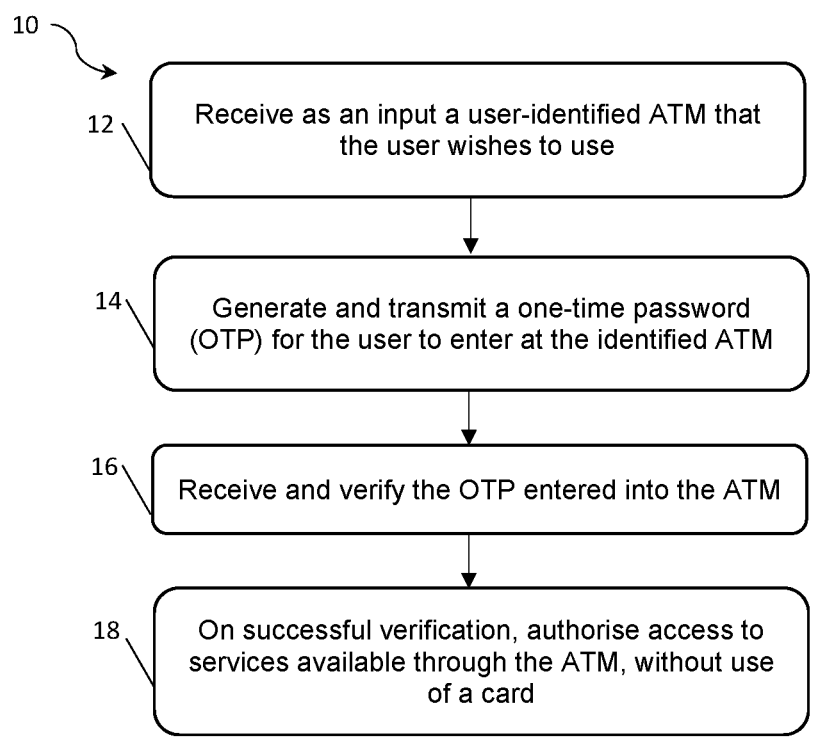
FIG. 1 is a flowchart of a computer-implemented method according to an embodiment of the present disclosure.

In accordance with an embodiment of the present disclosure, a computer-implemented method 10 for cardless use of an automated teller machine (ATM), as illustrated in FIG. 1, is provided. In particular, the method includes the following steps:

Step 12: receiving as an input a user-identified ATM that the user wishes to use;

Step 14: generating and transmitting a one-time password (OTP) for the user to enter at the identified ATM;

Step 16: receiving and verifying the OTP entered into the ATM; and

Step 18: on successful verification, authorizing access to services available through the ATM, without use of a card.

Figure 2:
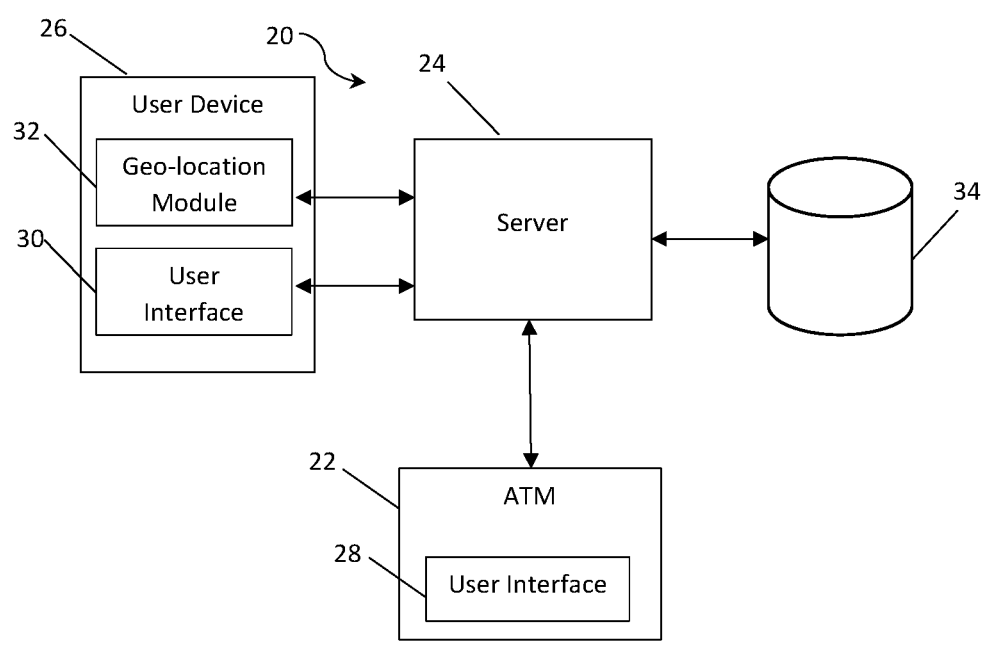
FIG. 2 is a block diagram of a computer system according to an embodiment of the present disclosure.

FIG. 2 shows a block diagram of a computer system 20 according to an embodiment of the present disclosure. The computer system 20 is configured for cardless use of an automated teller machine (ATM) 22, in accordance with the method described above, and includes a server 24 configured to a) receive as an input from a user device 26, a user-identified ATM 22 that the user wishes to use, b) generate and transmit a one-time password (OTP) to the user device 26 for the user to enter at the identified ATM 22, c) receive and verify the OTP entered into the ATM 22, and d) on successful verification, authorize access to services available through the ATM 22, without use of a card.

As illustrated in FIG. 2, the ATM 22 has a user interface 28 through which the user can enter the OTP. Notably, the ATM 22 is adapted to offer the user an option of cardless withdrawal which, if selected, will present the user with the user interface 28 for entering the OTP.

The user device 26 (which may be a PC, smartphone, or table computer) also has a user interface 30 through which the user can identify the ATM 22 he/she wishes to use and a geo-location module 32 which is operable to determine the location of the device (e.g. using GPS technology) so that a nearby ATM 22 can be identified.

A database 34 to store user account details is provided. Although not shown, a further database to store ATM locations may also be provided.

Detailed operation of the present embodiment will be described below once all of the hardware has been described.

Figure 3:
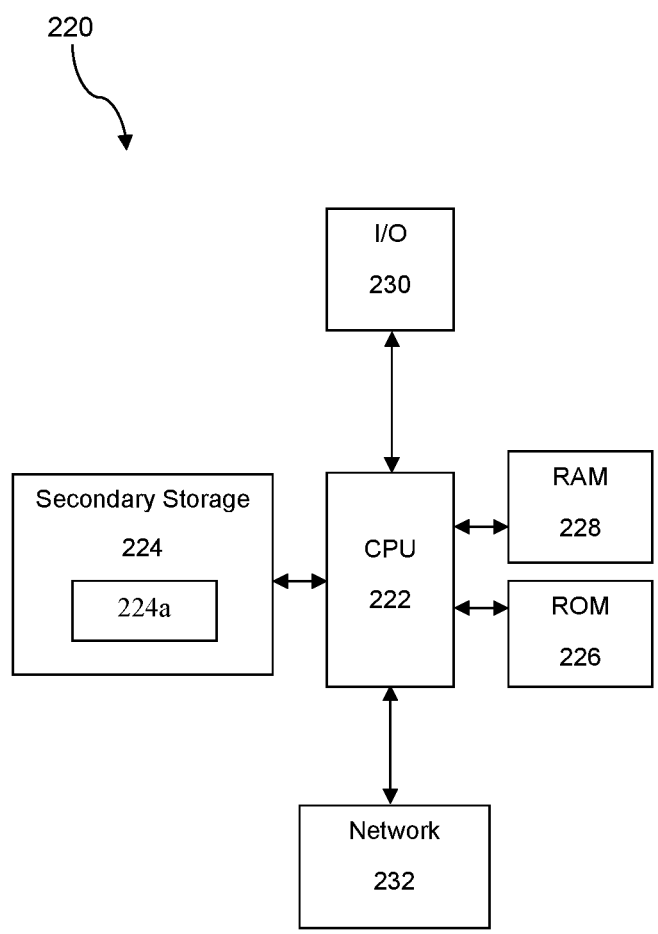
FIG. 3 is a block diagram illustrating a technical architecture of a server of FIG. 2.

FIG. 3 is a block diagram showing a technical architecture of the server 24 configured to perform the method 10 which is outlined above with reference to FIG. 1. Typically, the method 10 is implemented by a computer server including a data-processing unit. The block diagram, as shown in FIG. 3, illustrates a technical architecture 220 of a server which is suitable for implementing one or more embodiments herein.

The technical architecture 220 includes a processor 222 (which may be referred to as a central processor unit or CPU) that is in communication with memory devices including secondary storage 224 (such as disk drives), read only memory (ROM) 226, and random access memory (RAM) 228. The processor 222 may be implemented as one or more CPU chips. The technical architecture 220 may further include input/output (I/O) devices 230, and network connectivity devices 232.

The secondary storage 224 typically includes one or more disk drives or tape drives and is used for non-volatile storage of data and as an over-flow data storage device, if RAM 228 is not large enough to hold all working data. Secondary storage 224 may be used to store programs which are loaded into RAM 228 when such programs are selected for execution.

In this embodiment, the secondary storage 224 has a component 224a including non-transitory instructions operative by the processor 222 to perform various operations of the method of the present disclosure. The ROM 226 is used to store instructions and also data which are read during program execution. The secondary storage 224, the RAM 228, and/or the ROM 226 may be referred to in some contexts as computer readable storage media and/or non-transitory computer readable media.

I/O devices 230 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols, such as code division multiple access (CDMA), global system for mobile communications (GSM), long-term evolution (LTE), worldwide interoperability for microwave access (Wi-MAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the above-described method operations. Such information, which is often represented as a sequence of instructions to be executed using processor 222, may be received from and outputted to the network, for example, in the form of a computer data signal embodied in a carrier wave.

The processor 222 executes instructions, codes, computer programs or scripts which processor 222 accesses from hard disk, floppy disk, optical disk (these various disks based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

Although the technical architecture 220 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualisation software may be employed by the technical architecture 220 to provide the functionality of a number of servers that is not directly bound to the number of computers in the technical architecture 220. In an embodiment, the functionality disclosed above may be provided by executing the application and/or applications in a cloud computing environment. Cloud computing may include providing computing services via a network connection using dynamically scalable computing resources. A cloud computing environment may be established by an enterprise and/or may be hired on an as-needed basis from a third party provider.

It should be understood that by programming and/or loading executable instructions onto the technical architecture 220, at least one of the CPU 222, the RAM 228, and the ROM 226 are changed, transforming the technical architecture 220 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

FIGS. 1 to 3 explain the disclosure in terms of the method 10 being performed by a server. However, alternatively, the method may be performed by a user device having downloaded appropriate software from the server 24. The user device may communicate with the server 24 to obtain data which is required, such as from the database 34.

Figure 4:
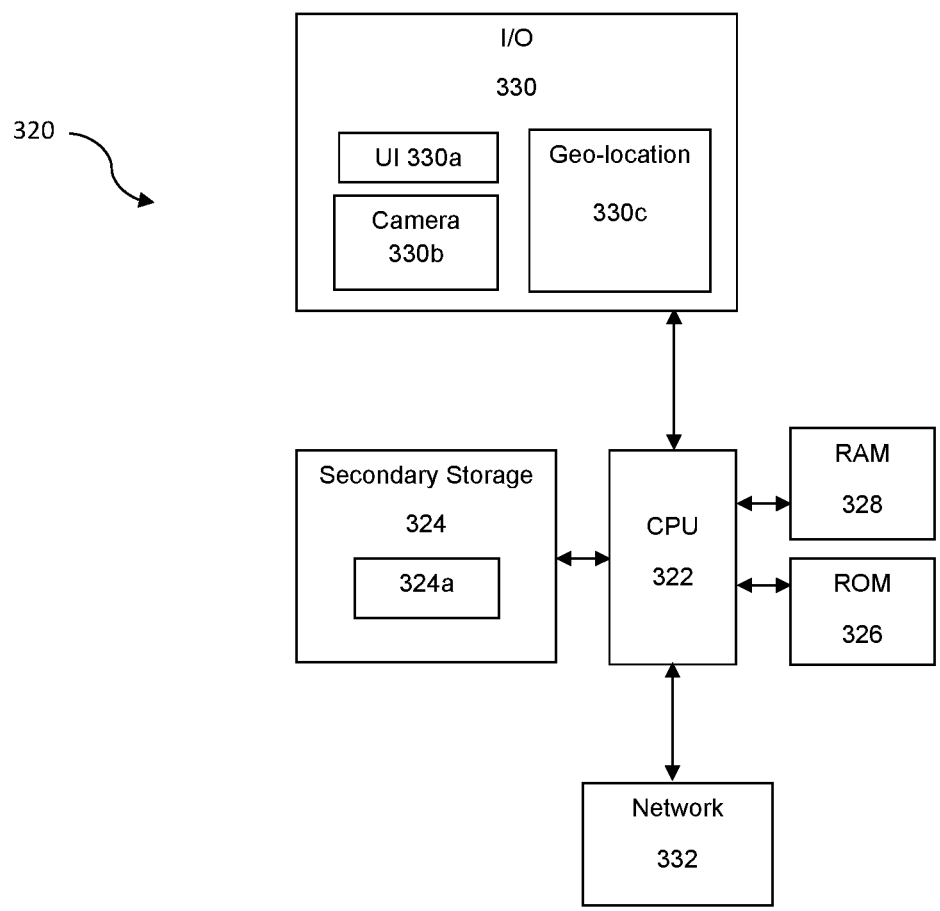
FIG. 4 is a block diagram illustrating a technical architecture of a user device which may be employed in the implementation of embodiments of the disclosure.

FIG. 4 is a block diagram showing a technical architecture of the user device 26. It is envisaged that in certain embodiments, the user device 26 will be a smartphone or tablet computer. The block diagram, as shown in FIG. 4, illustrates a technical architecture 320 of a user device which is suitable for implementing one or more embodiments herein.

The technical architecture 320 includes a processor 322 (which may be referred to as a central processor unit or CPU) that is in communication with memory devices including secondary storage 324 (such as disk drives or memory cards), read only memory (ROM) 326, and random access memory (RAM) 328. The processor 322 may be implemented as one or more CPU chips. The technical architecture 320 further includes, input/output (I/O) devices 330 and network connectivity devices 332.

The I/O devices include a user interface (UI) 330a, a camera 330b, and a geolocation module 330c. The UI 330a may include a touch screen, keyboard, keypad, or other known input device. The camera 330b allows a user to capture images and save the captured images in electronic form. The geolocation module 330c is operable to determine the geolocation of the user device 26 using signals from, for example, global positioning system (GPS) satellites.

The secondary storage 324 typically includes a memory card or other storage device and is used for non-volatile storage of data and as an over-flow data storage device, if RAM 328 is not large enough to hold all working data. Secondary storage 324 may be used to store programs which are loaded into RAM 328 when such programs are selected for execution.

In this embodiment, the secondary storage 324 has a component 324a, including non-transitory instructions operative by the processor 322 to perform various operations of the method of the present disclosure. The ROM 326 is used to store instructions and also data which are read during program execution. The secondary storage 324, the RAM 328, and/or the ROM 326 may be referred to in some contexts as computer readable storage media and/or non-transitory computer readable media.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols, such as code division multiple access (CDMA), global system for mobile communications (GSM), long-term evolution (LTE), worldwide interoperability for microwave access (Wi-MAX), near field communications (NFC), radio frequency identity (RFID), and/or other air interface protocol radio transceiver cards, and other well-known network devices. These network connectivity devices 332 may enable the processor 322 to communicate with the Internet or one or more intranets. With such a network connection, it is contemplated that the processor 322 might receive information from the network, or might output information to the network in the course of performing the above-described method operations. Such information, which is often represented as a sequence of instructions to be executed using processor 322, may be received from and outputted to the network, for example, in the form of a computer data signal embodied in a carrier wave.

The processor 322 executes instructions, codes, computer programs or scripts which processor 322 accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

In embodiments of the disclosure, the server 24 may generate HTML or XML code which a browser of the user device 26 can use to generate a window presenting data on a screen of the user device 26 for a web-based implementation. Alternatively, the user device 24 may be configured to run an application ("APP") through which the user can carry out steps of the method described above in accordance with embodiments of the disclosure.

Figure 5:
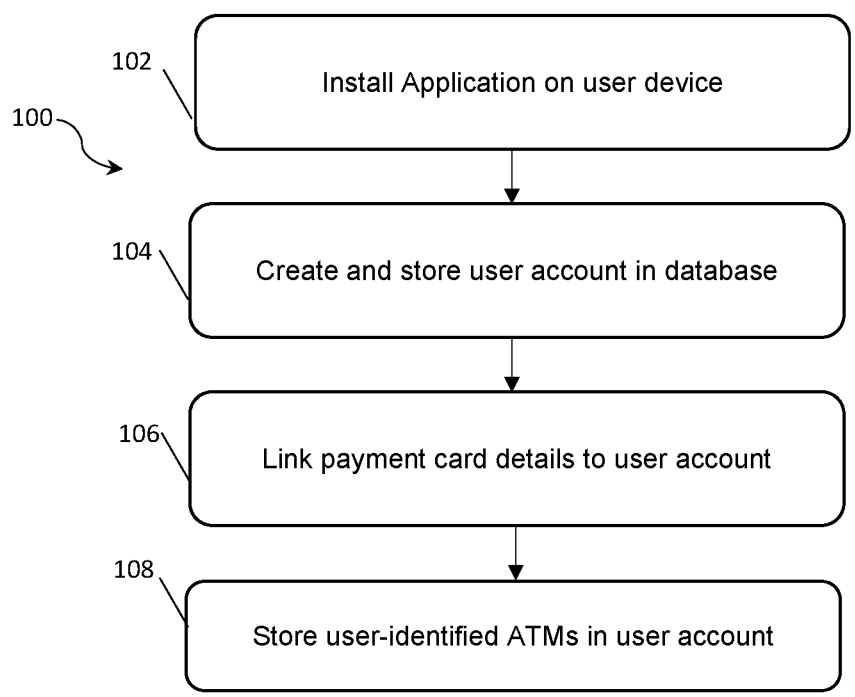
FIG. 5 is a flowchart of a registration procedure in accordance with an embodiment of the present disclosure.

FIG. 5 illustrates a registration procedure 100 in accordance with an embodiment of the disclosure. The registration procedure 100 includes the following steps:

Step 102: Install Application on user device. This may include the user downloading the application from an internet web server and installing the application to run on his/her local device (e.g. PC, smartphone or tablet).

Step 104: Create and store user account in database. This may include the user entering personal details (e.g. name, address, phone number) into an electronic form which is submitted over the internet to the server 24 which then stores the data in the database 34. This may also include storing in the database 34 a mobile number for the user device 26 on which the application is run so that it can be used for delivery of the OTP. This may be achieved by the user transmitting the mobile number to the server 24 during the registration procedure, for storing in the user's account in the database 34. The user may also set up a security feature (e.g. password, PIN, or biometrics) so only he/she can access the application.

Step 106: Link payment card details to user account. This may include the user entering payment card details (e.g. card number, expiry date, CSV) into another electronic form which is submitted over the internet to the server 24 which then stores the data in the database 34. This step may also require the user to enter a password, PIN, or biometrics so that the user's identity can be verified over the internet by the user's bank or payment card issuer.

Step 108: Store user-identified ATMs in user account. The user may identify one or more ATMs 22 for storing in his/her user account in the database 34 for subsequent use. The user may identify the ATMs from a map, list, search option, geo-location module on the user device, manual input, or electronic input (e.g. by scanning a QR code or barcode on the ATM itself).

In other embodiments, the user account may be stored locally on the user device 26.

In use, the user may logon to the application by satisfying the security feature previously set-up (i.e. by entering his/her password). The user may then be presented with one or more control elements which can be interacted with by the user (e.g. by clicking, tapping or pressing via the user interface 30) in order for the user to select the ATM he/she wishes to use. As explained previously, this may or may not be an ATM already stored in the database 34 associated with the user's account. For example, the user's stored ATMs may be retrieved from the database 34 (after a communication requesting this information is relayed from the user device 26 to the server 24) and presented to the user with the most commonly selected ATM presented first. The user may then select the ATMs he/she wishes to use from the list presented. Alternatively, the user may input details of another ATM using the user interface 30. In which case, the user may be presented with one or more of a map which shows the current location of the user device (as obtained from the geo-location module 32 in communication with GPS satellites) along with the locations of nearby ATMs which the user can click on to select, a list of ATMs that he/she scan scroll through, an input field in which he/she can type in an address or ATM ID, or an option to scan/photograph a barcode or QR code on the ATM itself.

Once the user has selected the ATM he/she wishes to use via the application, he/she may also be prompted to select the type of service he/she requires from the ATM and possibly also further details such as the amount of money he/she wishes to withdraw. The user may confirm the service required through use of a further control element. This will cause a communication module to transmit details of the requested service (e.g. identified ATM, service required, payment amount) to the server 24.

The server 24 may then check that the user is authorized to use such a service (e.g. by approving the withdrawal from the user's bank account over a payment network).

The server 24 will then generate a one-time password (OTP) and transmit it to the user device. This may be transmitted in the form of an SMS or email that is sent to the user device using the mobile number/email address stored in the database. In other embodiments, the OTP may be transmitted to the user device by another known messaging type.

At the ATM, the user will need to be able to select an option of cardless withdrawal before entering the OTP. The ATM will communicate with the server to verify the OTP (i.e. check if the OTP is the same as the OTP sent to the user, which was stored in the user account database) and, if the OTP is successfully verified, the server will instruct the ATM to provide the user with the requested service, without use of his/her card. Of course, if the OTP cannot be verified as correct (either because the OTP is wrong or the ATM used is not the one that was identified), access to the ATM's services will be refused. Once access is granted, the user may be able to use the ATM for any services he/she requires in the same way as he/she would have, had he/she presented a card and associated password to the ATM.

Advantages of embodiments of the present disclosure are that users need not carry payment cards in order to withdraw funds (or access other secure services) from ATMs. In addition, the ease of use and convenience of using a mobile device for authorization is believed to represent the future of the payments industry.

Although only a single system and method according to embodiments of the present disclosure have been described in detail, many variations are possible in accordance with the appended claims.

What is claimed is:

1. A computer-implemented method for cardless use of an automated teller machine (ATM), the method implemented using a computer system comprising a server, the server including at least one processor in communication with a database, the method comprising:

receiving, by the server from a mobile user device associated with a user, a registration request for a computer application, wherein the registration request includes user account information of the user and at least one ATM identifier selected by the user, and wherein each of the at least one ATM identifier corresponds to an ATM;

linking, by the server within the database, the user account information and the at least one ATM identifier, wherein the link between the at least one ATM identifier and the user account information represents that the corresponding ATM is authorized for subsequent use by the user;

receiving, by the server from the mobile user device subsequent to the linking, login information inputted by the user;

granting, by the server to the user, access to the computer application in response to the login information matching the user account information;

causing, by the server, to be displayed on the mobile user device one or more authorized ATMs for selection by the user;

receiving, by the server, an input from the mobile user device, the input including a selection of a displayed ATM that the user wishes to use and at least one service provided by the displayed ATM;

generating and transmitting, by the server, a one-time password (OTP) for the user to enter at the selected ATM;

receiving and verifying, by the server, the OTP entered into the selected ATM; and on successful verification, authorizing, by the server, access to the at least one service available through the selected ATM, without use of a card.

2. The method according to claim 1 wherein the computer application is one of a website application and a mobile application.

3. The method according to claim 1 wherein the computer application comprises one or more security features to prevent unauthorized use.

4. The method according to claim 3 wherein the security features comprise a password, PIN code, or biometrics.

5. The method according to claim 1 further comprising a registration procedure in which the user is required to register a bank account or payment card with the computer application.

6. The method according to claim 5 wherein the registration procedure comprises storing in the database details concerning a mobile number or email address for the mobile user device.

7. The method according to claim 1 wherein each ATM is identifiable from a map, list, search option, geo-location device, manual input, or electronic input.

8. The method according to claim 1 wherein the user is presented with one or more control elements which can be interacted with by the user in order for the user to select the ATM the user wishes to use.

9. The method according to claim 1 further comprising receiving an indication of a type of the at least one service the user requires from the selected displayed ATM.

10. The method according to claim 1 wherein the user receives the OTP through the user mobile device.

11. The method according to claim 1 wherein one or more restrictions are placed on the at least one service available through the ATM, without use of a card.

12. The method according to claim 1 wherein the OTP is configured to expire after a pre-determined time period.

13. The method according to claim 12 wherein the OTP is configured to expire after 30 minutes.

14. The method according to claim 1 wherein the at least one service available through the displayed ATM comprises one or more of the following: deposits, withdrawals, transfers, balance/overdraft information, pin services, account services, card-blocking, topping-up of pre-paid cards, and obtaining statements of accounts.

15. A computer system for cardless use of an automated teller machine (ATM) comprising a server, the server including at least one processor in communication with a database, the at least one processor configured to:
   receive, from a mobile user device associated with a user, a registration request for a computer application, wherein the registration request includes user account information of the user and at least one ATM identifier selected by the user, and wherein each of the at least one ATM identifier corresponds to an ATM;
   link, within the database, the user account information and the at least one ATM identifier, wherein the link between the at least one ATM identifier and the user account information represents that the corresponding ATM is authorized for subsequent use by the user;
   receive, from the mobile user device subsequent to the linking, login information inputted by the user;
   grant, to the user, access to the computer application in response to the login information matching the user account information;
   cause to be displayed on the mobile user device one or more authorized ATMs for selection by the user;
   receive, from the mobile user device, an input including a selection of a displayed ATM that the user wishes to use and at least one service provided by the displayed ATM;
   generate and transmit a one-time password (OTP) for the user to enter at the selected ATM;
   receive and verify the OTP entered into the selected ATM; and
   on successful verification, authorize access to at least one service available through the selected ATM, without use of a card.

16. A non-transitory computer-readable medium having stored thereon program instructions causing at least one processor to:
   receive, from a mobile user device associated with a user, a registration request for a computer application, wherein the registration request includes user account information of the user and at least one ATM identifier selected by the user, and wherein each of the at least one ATM identifier corresponds to an ATM;
   link, within a database, the user account information and the at least one ATM identifier, wherein the link between the at least one ATM identifier and the user account information represents that the corresponding ATM is authorized for subsequent use by the user;
   receive, from the mobile user device subsequent to the linking, login information inputted by the user;
   grant, to the user, access to the computer application in response to the login information matching the user account information;
   cause to be displayed on the mobile user device one or more authorized ATMs for selection by the user;
   receive, from the mobile user device, an input including a selection of a displayed ATM that the user wishes to use and at least one service provided by the displayed ATM;
   generate and transmitting a one-time password (OTP) for the user to enter at the selected ATM;
   receive and verifying the OTP entered into the selected ATM; and
   on successful verification, authorize access to at least one service available through the selected ATM, without use of a card.

17. A mobile user device configured for a user to gain cardless access to an ATM, the mobile user device programmed to:
   transmit, to a server, a registration request for a computer application, wherein the registration request includes user account information of the user and at least one automated teller machine (ATM) identifier selected by the user, and wherein each of the at least one ATM identifier corresponds to an ATM;
   transmit, to the server, login information inputted by the user;
   receive, from the server, access to the computer application in response to the login information matching the user account information;
   display one or more authorized ATMs returned by the server, the one or more authorized ATMs for selection by the user;
   transmit, to the server, an input from the user, the input including a selection of a displayed ATM that the user wishes to use and at least one service provided by the displayed ATM, wherein the displayed ATM is one of the one or more authorized ATMs;
   receive, from the server, a one-time password (OTP) for the user to enter at the selected ATM; and
   display the OTP to the user, wherein the OTP is configured to be verified by the server so that, on successful verification, the server authorizes access to the at least one service available through the selected ATM, without use of a card.

* * * * *